(12) United States Patent
Mooij (10) Patent No.: US 8,746,327 B2
(45) Date of Patent: Jun. 10, 2014

(54) METHOD FOR COUPLING TWO ADJACENT HEAT EXCHANGERS AND COUPLING UNIT FOR USE THEREIN

(76) Inventor: Johannes Dirk Mooij, Zwolle (NL)

(*) Notice: Subject to any disclaimer, the term of this patent is extended or adjusted under 35 U.S.C. 154(b) by 1374 days.

(21) Appl. No.: 12/442,924

(22) PCT Filed: Nov. 2, 2007

(86) PCT No.: PCT/NL2007/000275
§ 371 (c)(1),
(2), (4) Date: Nov. 24, 2009

(87) PCT Pub. No.: WO2008/054199
PCT Pub. Date: May 8, 2008

(65) Prior Publication Data
US 2010/0122794 A1 May 20, 2010

(30) Foreign Application Priority Data
Nov. 2, 2006 (NL) ..................... 1032801

(51) Int. Cl.
*F24F 12/00* (2006.01)
*F28D 9/00* (2006.01)
*F28F 27/02* (2006.01)

(52) U.S. Cl.
CPC ........... *F24F 12/006* (2013.01); *F28D 9/0093* (2013.01); *F28F 27/02* (2013.01)
USPC ............ 165/103; 165/122; 165/143; 165/166

(58) Field of Classification Search
USPC .......................... 165/103, 166, 909
See application file for complete search history.

(56) References Cited

U.S. PATENT DOCUMENTS

| | | | | | |
|---|---|---|---|---|---|
| 1,825,498 | A | * | 9/1931 | Wogan | 165/157 |
| 1,941,365 | A | * | 12/1933 | Patterson et al. | 165/298 |
| 3,842,903 | A | * | 10/1974 | Rubinstein | 165/122 |
| 4,327,803 | A | * | 5/1982 | Muellejans et al. | 165/166 |
| 4,377,201 | A | * | 3/1983 | Kruse et al. | 165/76 |
| 5,002,118 | A | * | 3/1991 | Olmstead et al. | 165/54 |
| 5,024,263 | A | * | 6/1991 | Laine et al. | 165/283 |
| 5,193,610 | A | * | 3/1993 | Morissette et al. | 165/54 |
| 5,660,228 | A | * | 8/1997 | Steege et al. | 165/76 |
| 5,927,387 | A | * | 7/1999 | Nystrom | 165/103 |
| 6,085,834 | A | * | 7/2000 | Thomas et al. | 165/284 |
| 6,182,747 | B1 | * | 2/2001 | Stark | 165/166 |
| 7,090,000 | B2 | * | 8/2006 | Taylor | 165/103 |
| 7,575,044 | B2 | * | 8/2009 | Choi et al. | 165/103 |

(Continued)

FOREIGN PATENT DOCUMENTS

| | | |
|---|---|---|
| EP | 1132690 A1 | 9/2001 |
| FR | 2189695 A1 | 1/1974 |

(Continued)

*Primary Examiner* — Allen Flanigan
(74) *Attorney, Agent, or Firm* — Bozicevic, Field & Francis LLP; Bret E. Field (57) ABSTRACT

The invention relates to a system for coupling two adjacently placed heat exchangers (IL,IR), which is provided with a first coupling unit (11a) connected to the heat exchangers on a first side thereof, and a second coupling unit (11b) connected to the heat exchangers on a second side thereof. In each coupling unit an inlet duct (12) is herein formed for one of the heat exchangers connected thereto and an outlet duct (13) is formed for the other heat exchanger connected thereto. The inlet and outlet ducts can here intersect in each coupling unit. The coupling units can be identical and be arranged in the coupling system oriented in opposite directions.

14 Claims, 7 Drawing Sheets

(56) References Cited

U.S. PATENT DOCUMENTS

| | | | |
|---|---|---|---|
| 2005/0236136 A1* | 10/2005 | Veltkamp et al. | 165/4 |
| 2007/0209783 A1* | 9/2007 | Rohellec | 165/109.1 |

FOREIGN PATENT DOCUMENTS

| | | |
|---|---|---|
| JP | 01137138 A | 5/1989 |
| JP | 02010040 A | 1/1990 |
| JP | 04281138 A | 10/1992 |
| JP | 06307670 A | 11/1994 |
| JP | 09287794 A | 11/1997 |
| JP | 10318593 A | 12/1998 |
| JP | 11118222 A | 4/1999 |
| JP | 2000283517 A | 10/2000 |
| JP | 2001174021 A | 6/2001 |

* cited by examiner

METHOD FOR COUPLING TWO ADJACENT HEAT EXCHANGERS AND COUPLING UNIT FOR USE THEREIN

The invention relates to a system for coupling two adjacently placed heat exchangers, in particular counterflow heat exchangers.

Heat exchangers are used in many fields for cooling or heating flowing media by bringing these into indirect contact with a colder or warmer medium. An important field of application which has become increasingly widespread in recent years is heat recovery in ventilation systems for buildings. By bringing indrawn ventilation air into heat-exchanging contact with spent air extracted from a building, the heat present therein can be transferred, so preventing the ventilation having a discernible influence on the temperature in the building. On the one hand this reduces energy consumption, and on the other enhances comfort.

From the viewpoint of an efficient industrial production of heat exchangers it is recommended to limit as far as possible the number of different models and to make use as far as possible of standard modules, for instance adapted to the volumes of the buildings in which they will be mostly used. It is hereby not readily possible however to modify the capacity of such industrially produced heat exchangers to differing applications.

Attempts have therefore already been made in the past to combine multiple heat exchangers into a larger whole in order to arrive at a heat exchanger system with a higher capacity. A problem which occurs here is the distribution in correct manner of the indrawn airflows of both the outside air and the return air among the different heat exchangers. Adjacent placing of multiple heat exchangers has always resulted in practice in voluminous constructions with large and complicated inlet and outlet ducts which result in considerable pressure losses.

The invention now has for its object to provide a system for coupling two or more adjacently placed heat exchangers, wherein these drawbacks do not occur, or at least do so to lesser extent. According to the present invention this is achieved by a coupling system which is provided with a first coupling unit connected to the heat exchangers on a first side thereof, and a second coupling unit connected to the heat exchangers on a second side thereof, wherein in each coupling unit at least one inlet duct is formed for one of the heat exchangers connected thereto and at least one outlet duct is formed for the other heat exchanger connected thereto. By making use of such coupling units, which themselves define both inlet and outlet ducts, a compact system of mutually connected heat exchangers is obtained with low pressure losses.

The at least one inlet duct and the at least one outlet duct preferably intersect in each coupling unit, whereby the indrawn and blown-out airflows are properly separated from each other.

A coupling system which is simple to produce industrially is achieved when the coupling units are identical and are arranged in the coupling system oriented in opposite directions.

In order to enable switch-off of the ventilation system incorporating the heat exchangers a closing valve can be accommodated in each case in the at least one inlet duct of the first coupling unit and in the at least one outlet duct of the second coupling unit.

When the coupling system is provided with at least one bypass duct extending from the first to the second side and running along the heat exchangers, ventilation air can be rerouted along the heat exchangers. During for instance summer evenings, when the temperature of the indrawn ambient air is lower than the inside temperature, this relatively cool ambient air can hereby be guided directly to the space to be ventilated so that this space is also cooled. This is also referred to as night cooling.

A compact coupling system is in this case obtained when the at least one bypass duct runs through the first and second coupling unit and between the heat exchangers connected thereby. In order to reduce still further the dimensions of the coupling system, the heat exchangers are preferably offset as seen in the flow direction and the at least one bypass duct has a bending course.

The at least one bypass duct then advantageously runs parallel to the at least one inlet duct in the first coupling unit and parallel to the at least one outlet duct in the second coupling unit. The space in each coupling unit is thus utilized optimally and the construction thereof simplified.

The coupling system is preferably further provided with at least one closing valve accommodated in the at least one bypass duct.

When the closing valves are controllably connected to a central control member, the operation of the heat exchangers coupled by the coupling system can be controlled.

In this case the central control member can be adapted to control for opposed movement the closing valves in at least one of the inlet and outlet ducts on the one hand and the closing valve in the at least one bypass duct on the other, so that it is possible to switch between a day and night program.

A structurally simple coupling system is obtained when the coupling units are separate components which can be individually connected to the heat exchangers.

In order to enable the forming of an even larger three-dimensional system of heat exchangers, the coupling units and/or the heat exchangers advantageously have connecting elements for connection thereof transversely of the coupling direction to corresponding coupling units and/or heat exchangers.

When the closing valves of the different mutually connected heat exchangers are then all connected controllably to the same central control member, the operation of this entire system can be controlled integrally in simple manner.

In order to minimize undesirable heat losses the coupling units can be manufactured at least partially from a thermally insulating material.

Finally, the invention also relates to a coupling unit intended for application in a coupling system as described above.

The invention is now elucidated on the basis of an example, wherein reference is made to the accompanying drawing, in which.

In a heat exchanger 1, here a counterflow exchanger accommodated in a housing 4 (FIG. 1), air A which is drawn in from outside and which is for instance intended for ventilation of a space, is brought into indirect contact with return air R which comes from the space and is flowing in opposite direction. Opposite temperature changes hereby occur in the two airflows; the warmer of the two airflows is cooled while the colder of the two is heated. Such heat exchangers are applied particularly in regions where the ambient temperature is usually lower than the temperature in the space for ventilating. In this case the indrawn outside air A is heated and the extracted return air R is cooled. The heated airflow S is then fed to the space for ventilating, while the cooled airflow D is discharged to the atmosphere.

Figures 2, 3:
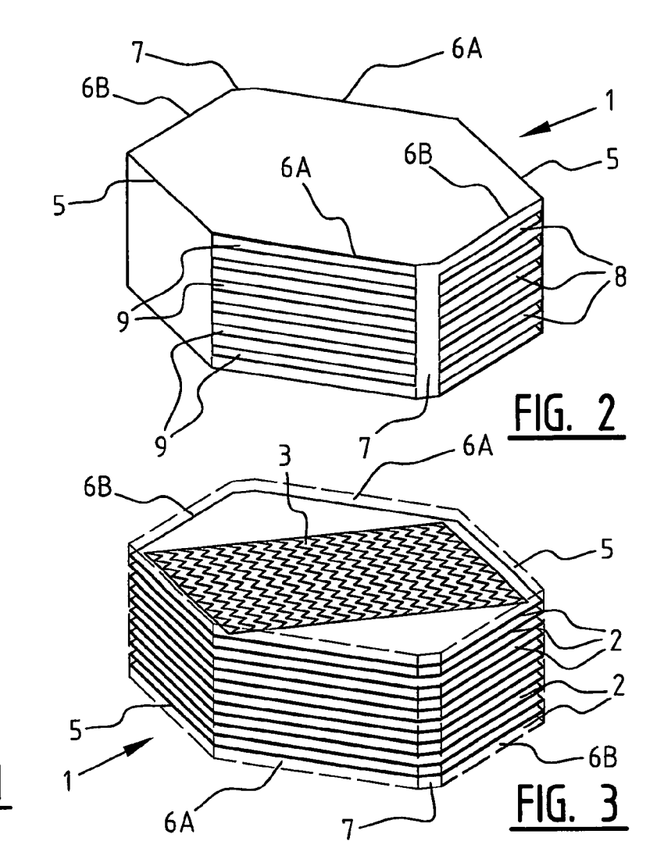
FIG. 2 is a perspective view of a counterflow heat exchanger of the type shown in FIG. 1.
FIG. 3 is a perspective view of the interior of the heat exchanger of FIG. 2.

Such a heat exchanger 1 is usually constructed from a number of relatively thin plates or foils 2 which have in the centre a profiled, for instance corrugated or sawtooth-like part 3 (FIG. 3). Profiled parts 3 of two plates or foils 2 lying one above the other herein define a number of parallel channels through which the air can flow. The stacked plates or foils 2 have a hexagonal form and are all mutually connected along their long sides 5. In addition, stacked plates 2 are alternately connected to each other along two of their four short sides 6A, 6B, whereby inflow openings 8 and outflow openings 9 are thus formed in each case on different sides of the flattened apex corners 7 which are in turn all mutually connected (FIG. 2). In each layer of heat exchanger 1 an intensive heat-exchanging contact can thus be established between the warmer and colder air flowing through the ducts in opposite directions. The direction of short sides 6A, 6B thus ensures here that the ingoing and outgoing airflows remain separated as far as possible, thus preventing air leaving heat exchanger 1 being immediately drawn back into it.

Figure 4:
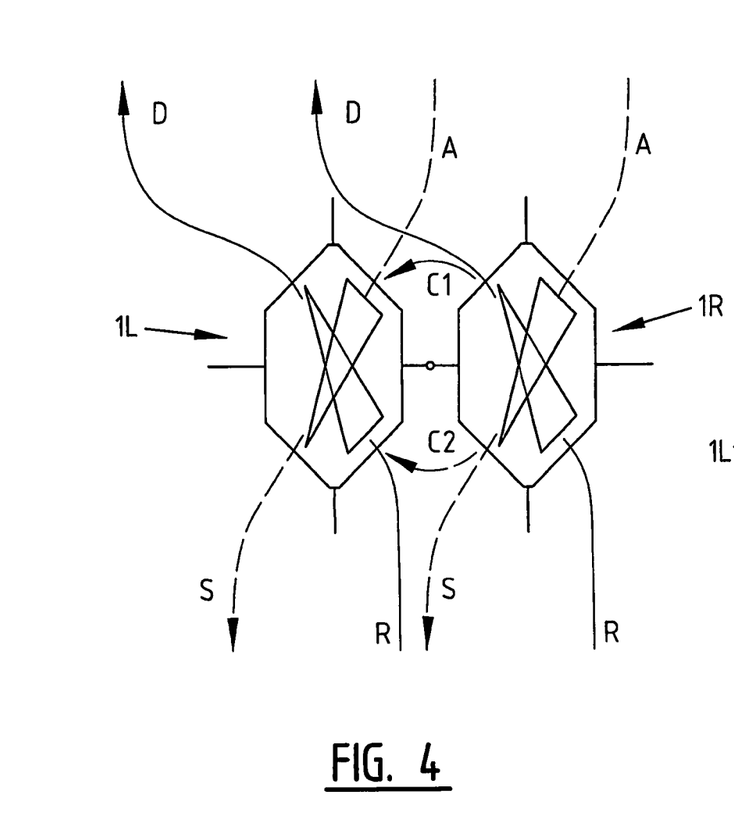
FIG. 4 is a schematic representation of the progression of the flow through two adjacently placed counterflow heat exchangers.

When it is desirable to increase the capacity of such a heat exchanger 1, the problem occurs that these exchangers are in practice only supplied in a number of common formats. Varying requirements in respect of the heat-exchanging capacity can thus only be met by combining a number of these standard heat exchangers 1. However, when two or more heat exchangers 1 are placed closely together, there is a danger of the outflowing air from the one exchanger 1 mixing with the airflow to the other exchanger 1, and thus being immediately fed back again (FIG. 4). This would result in an undesirable recirculation of discharged air (arrow CO or in indrawn, fresh outside air being immediately discharged again (arrow $C_2$). When heat exchangers 1 are however placed so far apart that such an undesirable mixing is avoided, the assembly of exchangers 1 becomes too large to allow installation in a relatively small space, such as the technical area of a building or dwelling.

The present invention therefore provides a system 10 for coupling two adjacently placed heat exchangers 1L, 1R such that the ingoing and outgoing airflows A and D respectively R and S remain separated from each other (shown schematically in FIG. 5), while the dimensions of the system of coupled heat exchangers 1L, 1R still remain relatively small.

Figure 1:
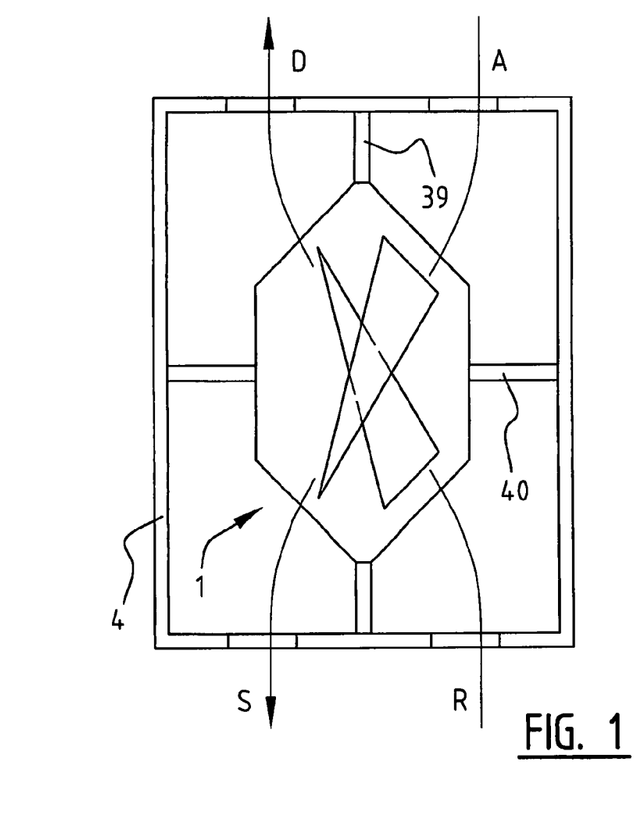
FIG. 1 is a schematic representation of the flow through a counterflow heat exchanger which is accommodated in a housing.
Figure 5:
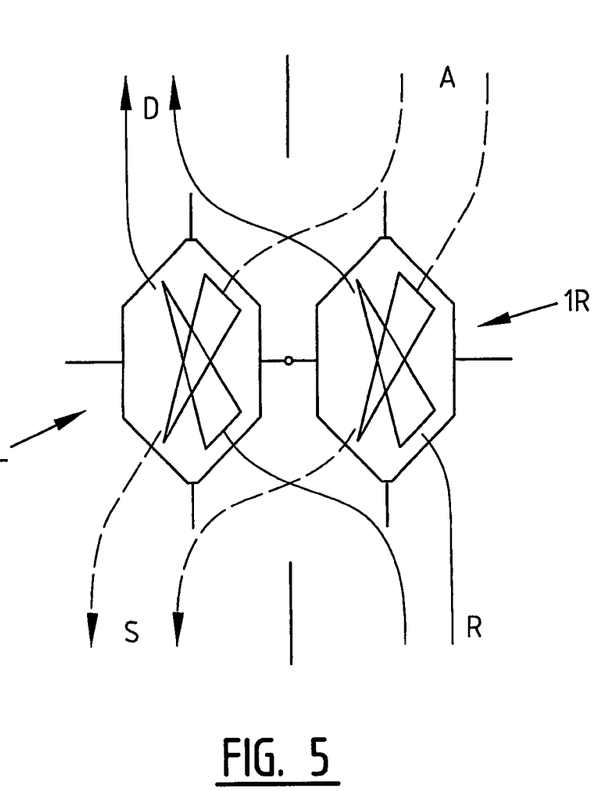
FIG. 5 shows a representation corresponding with FIG. 4 of the flow during use of the coupling system according to the invention.

Such a coupling system 10 for heat exchangers, in the shown example two counterflow heat exchangers 1L, 1R, comprises a first coupling unit 11A and a second coupling unit 11B. In the shown example the first coupling unit 11A is connected to heat exchangers 1L, 1R on the upper side thereof and second coupling unit 11B is connected to heat exchangers 1L, 1R on the lower side thereof. The terms "lower" and "upper" are here related to the arrangement as shown in FIGS. 1, 4 and 5, although it will be apparent that heat exchangers 1L, 1R can be coupled in any desired orientation, as also shown from FIG. 10. An inlet duct 12 for one of the two heat exchangers 1L, 1R and an outlet duct 13 for the other heat exchanger 1R, 1L is formed in both the first coupling unit 11A and in second coupling unit 11B. Inlet duct 12 and outlet duct 13 intersect in each coupling unit 11A, 11B.

As can be seen, coupling units 11A, 11B, which can be manufactured from a thermally insulating material, for instance a plastic, are identical. This is advantageous from a production viewpoint. Coupling units 11A, 11B are arranged in coupling system 10 oriented in opposite directions.

Coupling system 10 is further provided with a bypass duct 14 which extends from the upper side to the lower side and which runs along heat exchangers 1L, 1R. This bypass duct 14 runs through the two coupling units 11A, 11B, wherein it runs parallel to inlet duct 12 in first coupling unit 11A and, conversely, runs parallel to outlet duct 13 in second coupling unit 11B.

A closing valve 15, 16 is arranged in respectively inlet duct 12 of first coupling unit 11A and in outlet duct 13 of second coupling unit 11B. A closing valve 17 is also arranged in bypass duct 14. Since a single closing valve 17 suffices to close the whole bypass duct 14, the one coupling unit 11A is and the other coupling unit 11B is not provided with a closing valve, so that coupling units 11A, 11B are not identical in this respect.

The three closing valves 15, 16, 17 are each connected controllably to a central control member 18. This central control member 18 is adapted to control for opposed movement the closing valves 15, 16 in inlet and outlet ducts 12, 13 on the one hand and closing valve 17 in bypass duct 14 on the other.

Figure 10:
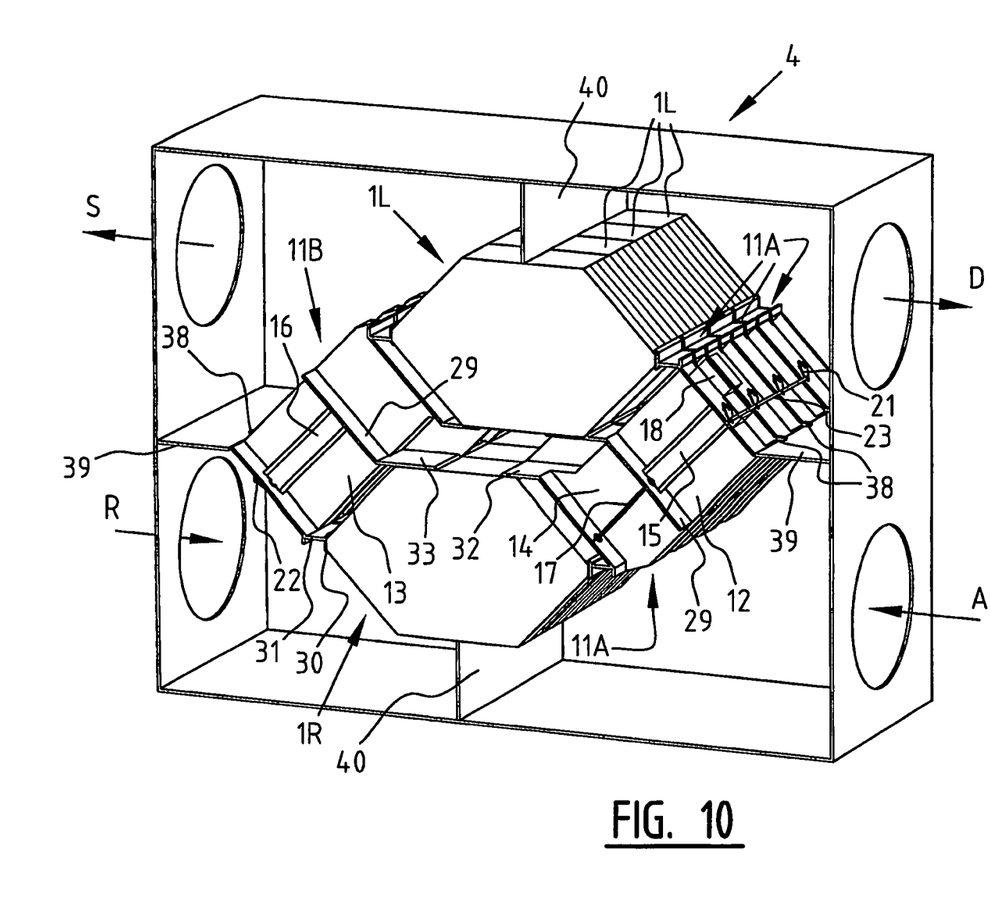
FIG. 10 is a perspective view of a number of mutually connected heat exchangers and coupling systems according to the invention in a shared housing.

In the shown example this is achieved in that closing valve 17 of bypass duct 14 and closing valve 15 of inlet duct 12 of first coupling unit 11A are mounted on a shared pivot shaft 19, wherein closing valves 15, 17 are rotated through 90° relative to each other. Closing valve 16 in outlet duct 13 of second coupling unit 11B is also mounted on a pivot shaft 20. Mounted in each case on the end of shafts 19, 20 protruding outside coupling units 11A, 11B is an arm 21, 22 which is connected to a central control member 18 by means of a transmission member, for instance a rod 23 (FIG. 10). This central control member 18 can comprise a controllable drive, for instance in the form of a stepping motor.

Figure 6:
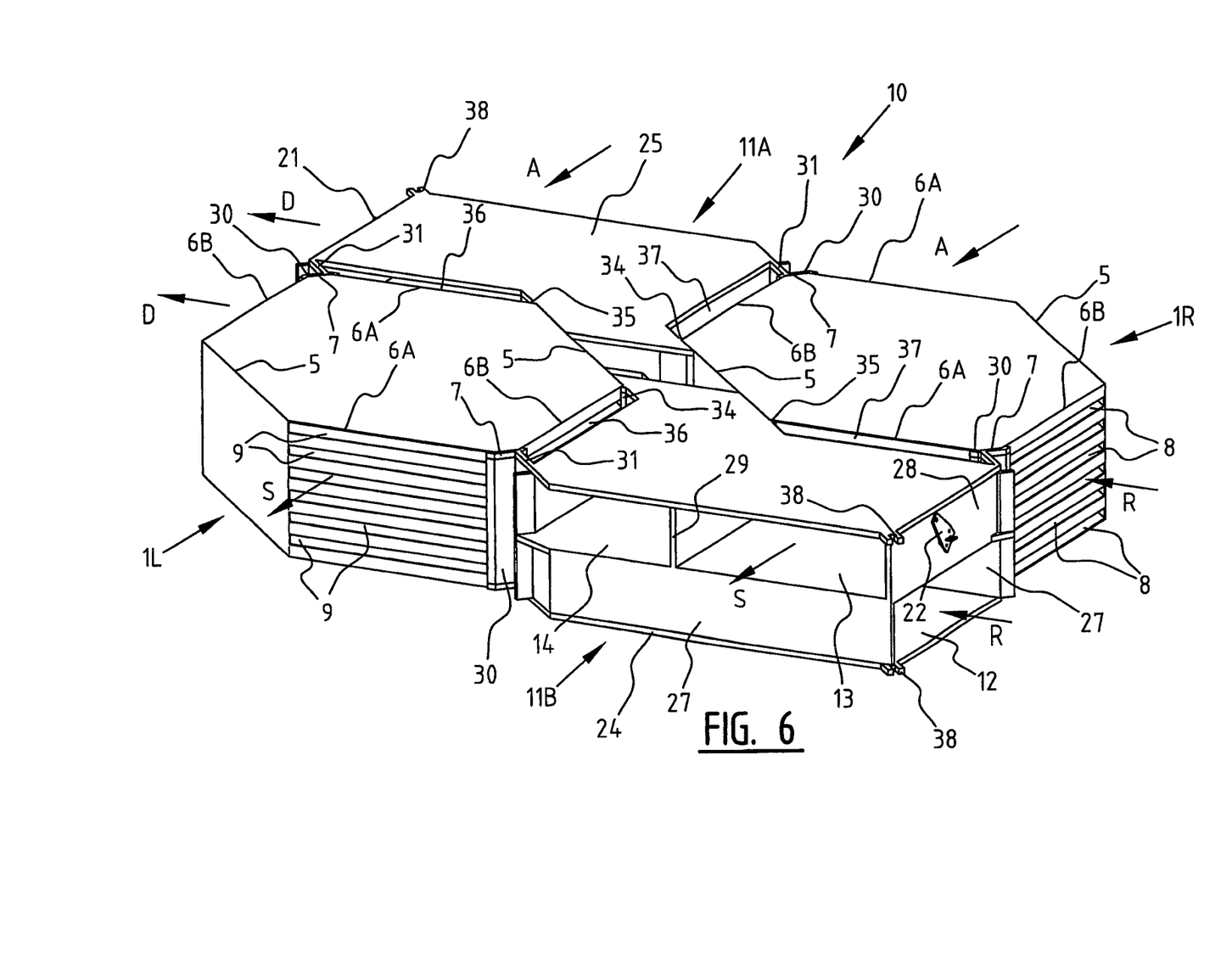
FIG. 6 is a perspective view of two heat exchangers coupled using the coupling system according to the invention.
Figure 7:
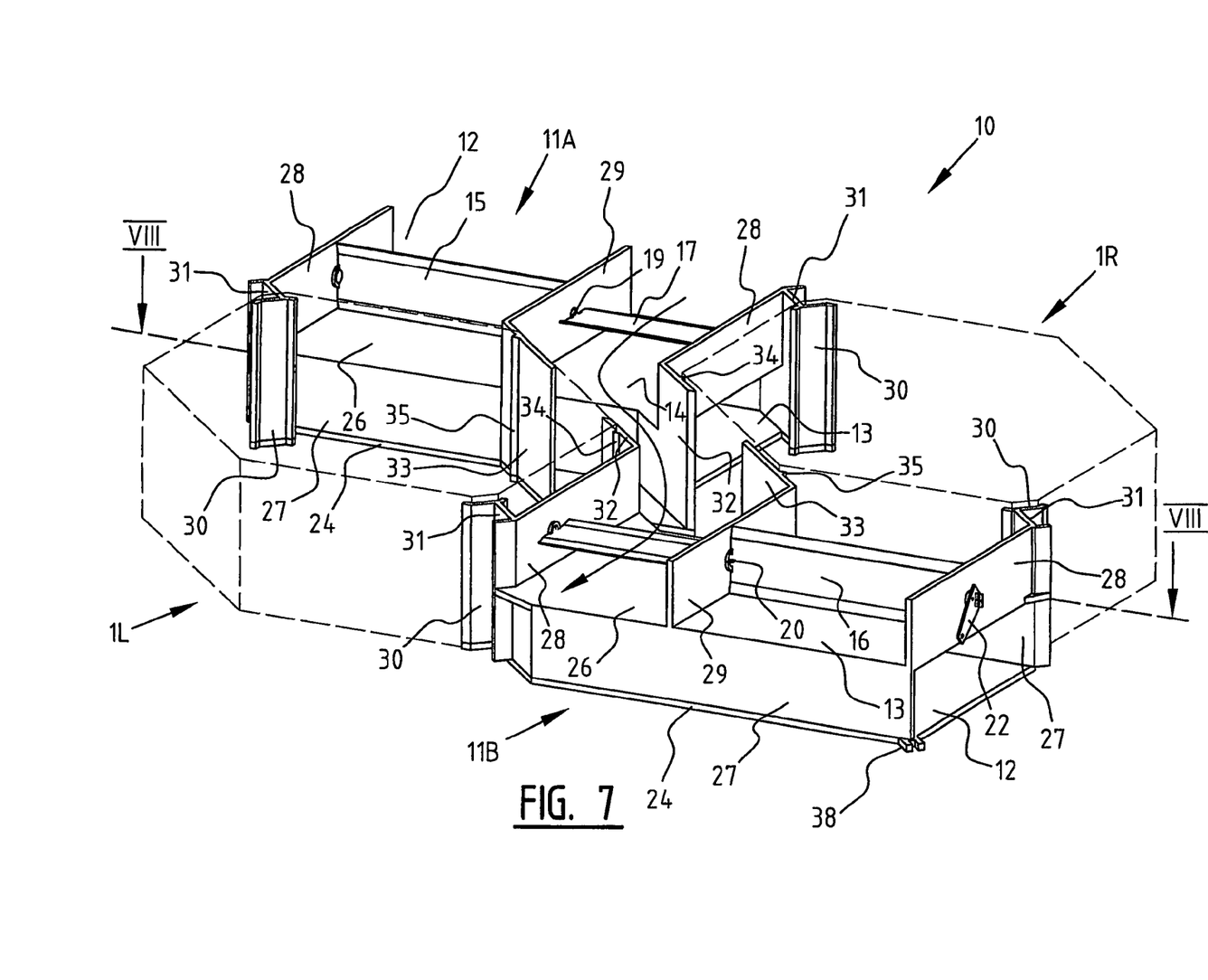
FIG. 7 is a view corresponding with FIG. 6 in which a side of the coupling system is cut away and in which the flow of indrawn air through the bypass duct is shown.
Figure 8:
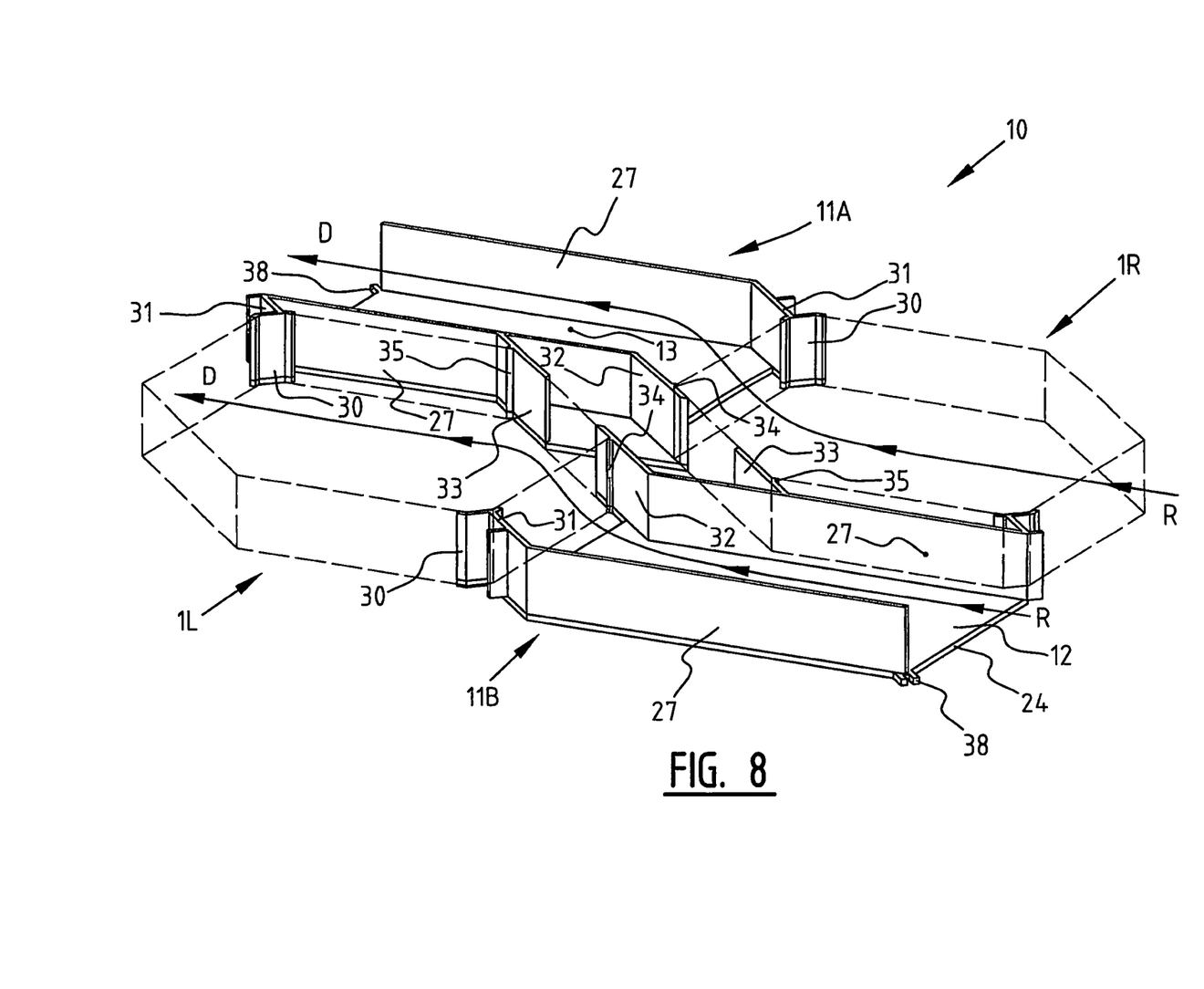
FIG. 8 is a perspective cross-sectional view along the line VIII-VIII in FIG. 7, which shows the return air part of the coupling system.
Figure 9:
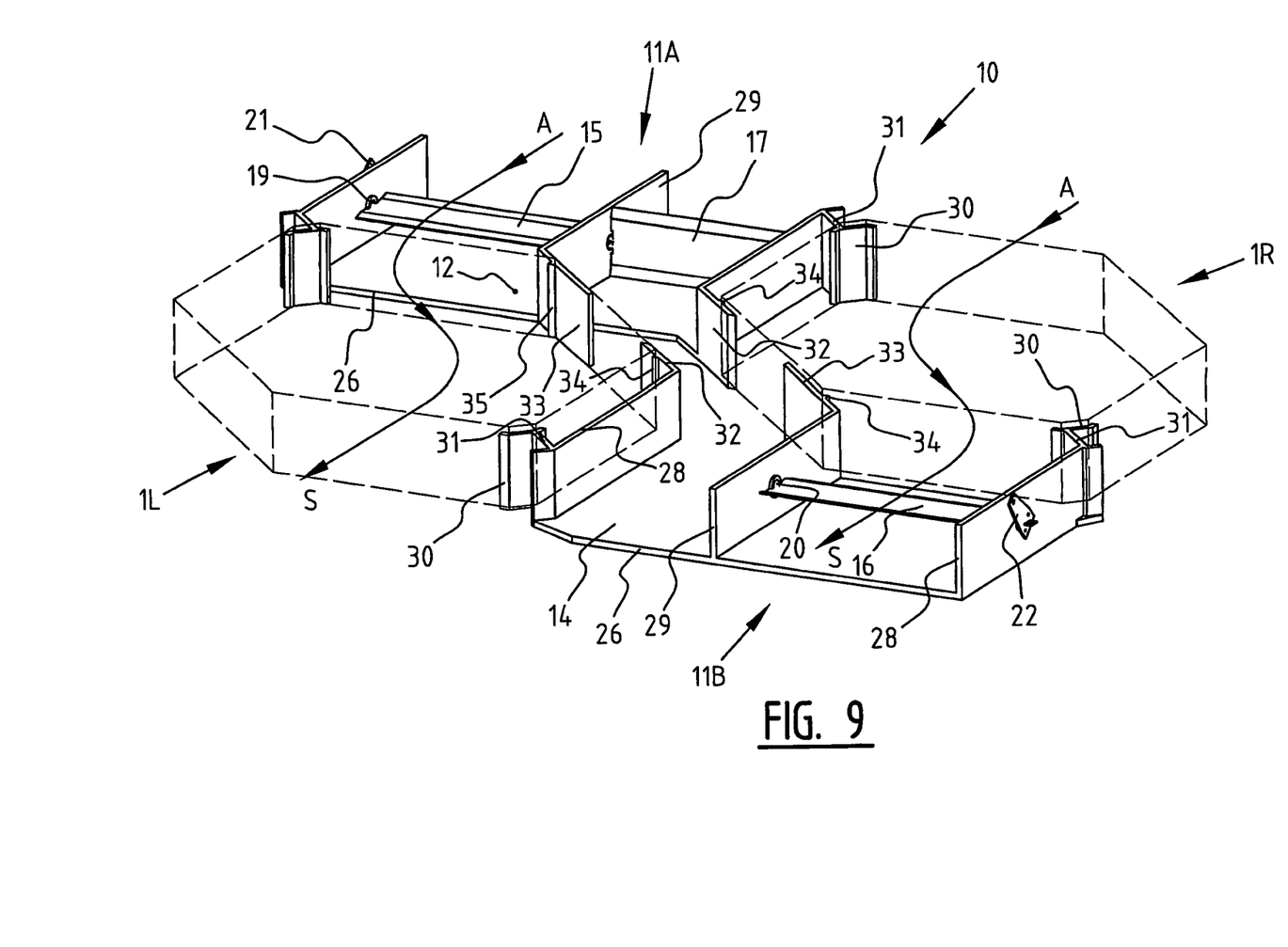
FIG. 9 is a view corresponding with FIG. 7, which is however limited to the ventilation air part of the coupling system in which the flow of the indrawn air through the heat exchangers is shown.

When the inside temperature is now relatively high, for instance more than 22-24° C., and the outside temperature falls below this value but is still pleasant, for instance at least 15-17° C., central control member 18 closes closing valves 15, 16 and simultaneously opens closing valve 17. Cooler ambient air A is then thus guided to the space for ventilating through bypass duct 14 round the outside of heat exchangers 1L, 1R (FIG. 7). Because the indrawn ambient air A is now not heated by the warmer return air R, it can be used not only to ventilate but also to simultaneously cool the space. Since this situation will occur particularly in the evening after a warm summer day, this is referred to as night cooling. The return air R, which is discharged from the space, is otherwise guided in the same manner through heat exchangers 1L, 1R under all circumstances (FIG. 8). As soon as the outside temperature has risen so far again that no further cooling takes place, central control member 18 closes closing valve 17 again while closing valves 15 and 16 are reopened, so that the indrawn outside air A is guided once again through heat exchangers 1L, 1R (FIGS. 6, 9).

Instead of closing the two closing valves 15, 16 in inlet and outlet ducts 12, 13 when closing valve 17 in bypass duct 14 is opened, it is also possible to envisage only one of the closing valves 15, 16 being closed when closing valve 17 is opened. One of the two heat exchangers then remains operative when ambient air A is fed through bypass duct 14 to the space for ventilating. In the embodiment shown here the closing valve 15 could for instance be operated in opposite direction to closing valve 17, while closing valve 16 is controlled separately and thus remains open or is closed as desired when closing valve 17 is opened. When closing valve 16 then remains open, heat exchanger 1R remains operative and the air from bypass duct 14 can be mixed with air which is heated in this heat exchanger 1R.

Use can thus still also be made of night cooling at lower temperatures, for instance in the order of 12 or 13° C. Continued heating at a later stage can hereby be prevented. In this situation there is a relatively small temperature drop so that the climate in the space for ventilating remains comfortable. A modulating night cooling is as it were achieved.

In the shown example of coupling system 10 the coupling units 11A, 11B are separate components which can be individually connected to heat exchangers 1L, 1R. Each coupling unit 11A, 11B is box-like and has a base 24, an upper wall 25 and an intermediate wall 26 halfway between base 24 and upper wall 25. In addition, each coupling unit 11A, 11B has a first set of mutually parallel side walls 27 which extend between base 24 and intermediate wall 26, and a second set of mutually parallel side walls 28 which extend between intermediate wall 26 and upper wall 25. The first and second set of side walls 27, 28 run perpendicularly of each other.

The space between base 24 and intermediate wall 26 which is bound by side walls 27 forms in first coupling unit 11A the outlet duct 13 for the airflow D to be blown out into the atmosphere from right-hand heat exchanger 1R, while this space forms in second coupling unit 11B the inlet duct 12 for the flow of return air R to left-hand heat exchanger 1L. The terms "left-hand" and "right-hand" relate here to the position taken up by heat exchangers 1L, 1R in FIGS. 4 and 5.

The space between intermediate wall 26 and upper wall 25 which is bounded by side walls 28 is divided by a wall 29 into two parallel channels. The narrower of these channels in the two coupling units 11A, 11B here forms part of bypass duct 14. The wider part of the space forms in first coupling unit 11A the inlet duct 12 for indrawn outside air A which flows to left-hand heat exchanger 1L, while in second coupling unit 11B this wider part forms outlet duct 12, through which the airflow S is guided from right-hand heat exchanger 1R to the space for ventilating.

Each coupling unit 11A, 11B has protruding mounting profiles 30 which are located on two diagonally opposite corners and which are each adapted to accommodate one of the flattened apex corners 7 of a heat exchanger 1L, 1R. These profiles 30 are arranged on spacers 31. At the position of bypass duct 14 each coupling unit 11A, 11B is further provided with protruding, oblique wall parts 32, 33, which form a continuation of respectively one of the side walls 28 and dividing wall 29. These protruding wall parts 32, 33 are each provided with a mounting ridge 34, 35 for receiving a corner between a long side 5 and a short side 6 of one of the heat exchangers 1L, 1R.

These mounting ridges 34, 35 are situated some distance outside the periphery of the box-like coupling unit 11A, 11B. In combination with spacers 31 this ensures that a distribution chamber 36 or a plenum chamber 37 is formed in each case between coupling unit 11A, 11B and the corresponding heat exchanger 1L, 1R. In distribution chambers 36 the airflow A or R coming from coupling unit 11A, 11B, can be distributed over the full height of left-hand heat exchanger 1L. Conversely, the airflow D or S from all layers of right-hand heat exchanger 1R can accumulate in plenum chambers 37 before being guided through a part of both coupling units 11A, 11B.

Because coupling units 11A, 11B are placed on different sides of heat exchangers 1L, 1R, heat exchangers 1L, 1R are in the coupled situation not situated at the same level adjacently of each other but are to some extent offset as seen in the direction of flow. A compact construction is hereby obtained. As a result of this offset arrangement the bypass duct 14 has a bending course. In addition, spacers 31 are oriented parallel to the protruding wall parts 32, 33 so that mounting profiles 31 are offset relative to the corresponding corner of coupling unit 11A, 11B. Heat exchangers 1L, 1R are hereby also offset in the width direction, whereby the assembly becomes even more compact. In order to guide the flow to and from heat exchangers 1L, 1R with minimal losses the outer ends of side walls 27 are bent (FIG. 8). As indicated above, the oblique wall part 32 hereby formed on the inside of each coupling unit 11A, 11B then also forms part—at a different level—of bypass duct 14.

In order to be able to make possible an even greater heat-exchanging capacity, in the shown example coupling system 10 has provisions for connecting coupling units 11A, 11B and/or heat exchangers 1L, 1R transversely of the coupling direction to corresponding coupling units and/or heat exchangers. In this case each coupling unit 11A, 11B is provided on its free corner with a protruding clamping part 38 (FIGS. 6, 7, 8), which can be pushed round a plate 39 in housing 4 (FIG. 10). A large number of heat exchangers 1L, 1R and coupling units 11A, 11B can thus be suspended adjacently of each other in housing 4, wherein suspension plates 39 and two fixation plates 40 function both as mounting elements and as dividing walls for the flow. All closing valves 15, 16, 17 in the different coupling units 11A, 11B can herein be connected via their arms 21, 22 and rods 23 to central control member 18.

The coupling system according to the invention thus makes it possible to connect a plurality of heat exchangers in simple manner within a small periphery without the properties of the individual heat exchangers being adversely affected thereby.

Although the invention has been elucidated above on the basis of an example, it will be apparent that it is not limited thereto. The form of the coupling units, the division thereof into channels and the manner of connecting thereof to the heat exchangers could thus be varied compared to the shown example. The coupling system could also be formed integrally. The location and embodiment of the bypass duct could also be chosen differently. It is thus possible to use the bypass duct to guide the extracted return air along the heat exchangers instead of the indrawn ambient air. The same cooling effect is hereby achieved. In addition, the use of a bypass duct could even be dispensed with for specific regions. Finally, the embodiment of the closing valves and the manner of operation thereof could be modified.

The scope of the invention is therefore defined solely by the following claims.

The invention claimed is:

1. A coupling system for coupling two adjacently placed heat exchangers, said coupling system comprising:
    a first coupling unit connected to the heat exchangers on a first side thereof; and
    a second coupling unit connected to the heat exchangers on a second side thereof;
    wherein in each coupling unit at least one inlet duct is formed for one of the heat exchangers connected thereto and at least one outlet duct is formed for the other heat exchanger connected thereto; and
    wherein the at least one inlet duct and the at least one outlet duct intersect in each coupling unit and are arranged such that a flow direction defined by the at least one inlet duct is at an angle to a flow direction defined by the at least one outlet duct;
    wherein said coupling system further comprises at least one bypass duct extending from the first to the second side and running along the heat exchangers, wherein the at least one bypass duct runs through the first and second coupling unit and between the heat exchangers connected thereby and the heat exchangers are offset as seen in the flow direction and the at least one bypass duct has a bending course.

2. The coupling system as claimed in claim 1, wherein the coupling units are identical and are arranged in the coupling system oriented in opposite directions.

3. The coupling system as claimed in claim 2, wherein a closing valve is accommodated in each case in the at least one inlet duct of the first coupling unit and in the at least one outlet duct of the second coupling unit.

4. The coupling system as claimed in claim 1, wherein the at least one bypass duct runs parallel to the at least one inlet duct in the first coupling unit and parallel to the at least one outlet duct in the second coupling unit.

5. The coupling system as claimed in claim 1, further compromising at least one closing valve accommodated in the at least one bypass duct.

6. The coupling system as claimed in claim 3, further comprising at least one closing valve arranged in a bypass duct running through the first and second coupling units and between the heat exchangers connected thereby, wherein each closing valve is connected controllably to a central control member.

7. The coupling system as claimed in claim 6, wherein the central control member is adapted to control the closing valves for opposed movement in at least one of the inlet and outlet ducts on the one hand and the closing valve in the bypass duct on the other.

8. The coupling system as claimed in claim 1, wherein the coupling units are separate components which can be individually connected to the heat exchangers.

9. The coupling system as claimed in claim 1, wherein the coupling units and/or the heat exchangers have connecting elements for connection thereof transversely of the coupling direction to corresponding coupling units and/or heat exchangers.

10. The coupling system as claimed in claims 9, wherein each coupling unit comprises a closing valve and wherein the closing valves of the different mutually connected coupling units are all connected controllably to the same central control member.

11. The coupling system as claimed in claim 1, wherein the coupling units are manufactured at her least partially from a thermally insulating material.

12. The coupling system as claimed in claim 1, wherein the at least one inlet duct and the at least one outlet duct of each coupling unit are arranged such that the flow direction defined by the at least one inlet duct is substantially at a right angle to the flow direction defined by the at least one outlet duct.

13. A coupling system for coupling two adjacently places heat exchangers, wherein each said heat exchanger has first and second inflow sides and first and second outflow sides opposite the respective inflow sides, said coupling system comprising:
    a first coupling unit connected to the first inflow side of one of the heat exchangers and to the second outflow side of the other heat exchanger; and
    a second coupling unit connected to the second inflow side of the one heat exchanger and to the first outflow side of the other heat exchanger;
    wherein in each coupling unit at least one inlet duct in formed for one of the heat exchangers connected thereto and at least one outlet duct is formed for the other heat exchanger connected thereto;
    wherein the coupling system further comprises at least one bypass duct extending from the first to the second side and running along the heat exchangers, wherein the at least one bypass duct runs through the first and second coupling unit and between the heat exchangers connected thereby and the heat exchangers are offset as seen in the flow direction and the at least one bypass duct has a bending course.

14. The coupling system as claimed in claim 13, wherein each said coupling unit is arranged upstream of the inflow side and downstream of he outflow side of the respective heat exchangers to which it is connected.

* * * * *